No. 632,190. Patented Aug. 29, 1899.
J. H. MARTINDALE.
MEASURING VESSEL.
(Application filed May 31, 1898.)
(No Model.) 2 Sheets—Sheet 1.
Fig. 1.
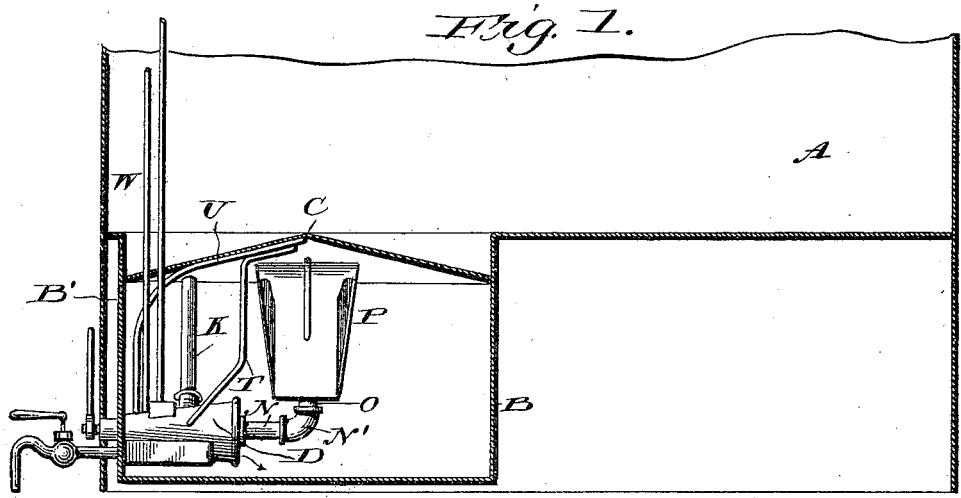
Fig. 6. Fig. 7. Fig. 8.
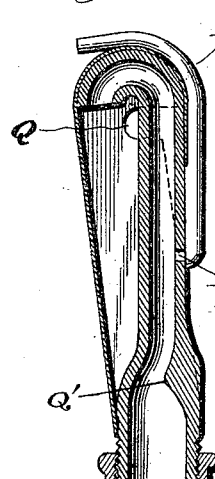 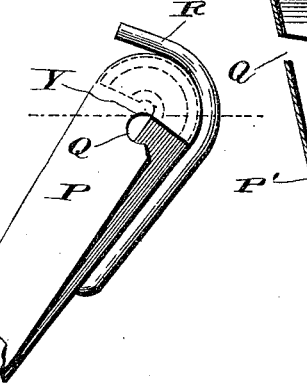 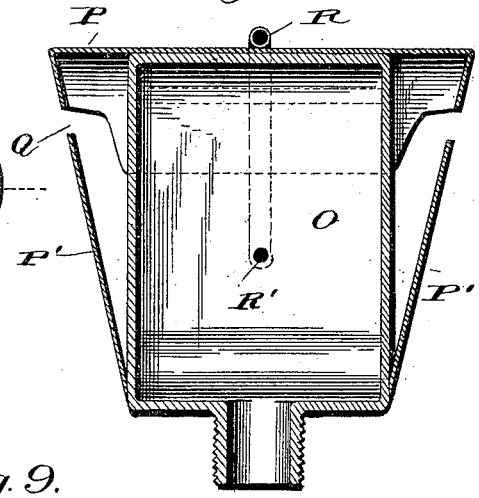
Fig. 9. Fig. 10
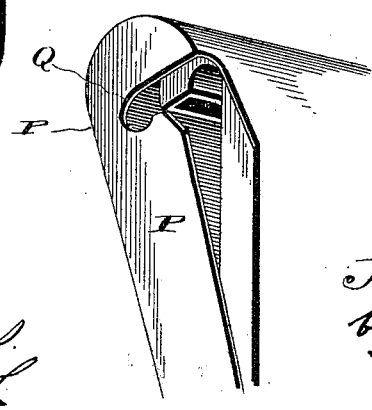 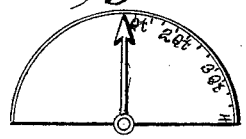
Witnesses
L. C. Hills
A. L. Hough
Inventor:
J. H. Martindale,
by Grove & Co
Attorney No. 632,190. Patented Aug. 29, 1899.
J. H. MARTINDALE.
MEASURING VESSEL.
(Application filed May 31, 1898.)
(No Model.) 2 Sheets—Sheet 2.
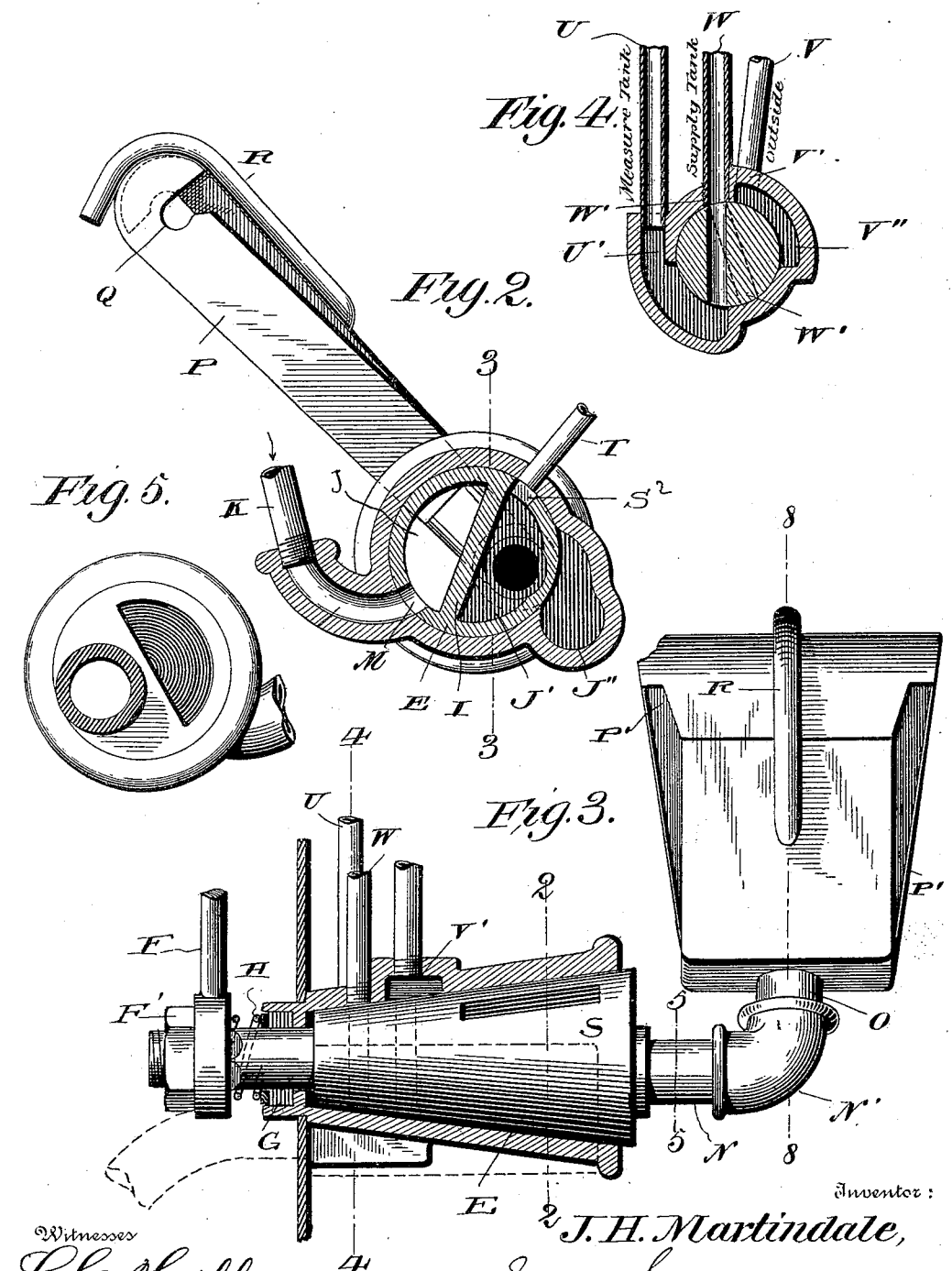

UNITED STATES PATENT OFFICE.

JOHN H. MARTINDALE, OF WARREN, PENNSYLVANIA, ASSIGNOR TO THE R. H. KINNEAR MANUFACTURING COMPANY, LIMITED, OF SAME PLACE.

MEASURING VESSEL.

SPECIFICATION forming part of Letters Patent No. 632,190, dated August 29, 1899.

Application filed May 31, 1898. Serial No. 682,207. (No model.)

*To all whom it may concern:*

Be it known that I, JOHN H. MARTINDALE, a citizen of the United States, residing at Warren, in the county of Warren and State of Pennsylvania, have invented certain new and useful Improvements in Measuring Vessels, of which the following is a specification, reference being had therein to the accompanying drawings.

This invention relates to improvements in measuring vessels; and it is the object of the present invention to generally improve upon and simplify this class of apparatus, whereby the measuring of liquids may be accurately accomplished without any loss of liquid.

The important feature of my invention resides in the provision of a movable siphon-break, whereby the supply of liquid which it is desired to draw will be instantly cut off at the moment the surface of the liquid in the measuring-receptacle lowers to a predetermined level, at which the air within the measuring-receptacle will break the flow of liquid through the siphon, which communicates with a spigot without the tank. In connection with the foregoing suitable vents are provided for allowing air to replace the spaces occupied by the liquid as it flows from the receptacles.

The invention relates, further, to various details of construction, which will be hereinafter fully described, and specifically defined in the appended claims.

I have clearly illustrated my invention in the accompanying drawings, which, with the letters of reference marked thereon, form a part of this application, and in which drawings similar letters of reference indicate like parts throughout the several views, in which—

Figure 1 is a central vertical section through a measuring-receptacle in which is shown in elevation the measuring apparatus. Fig. 2 is a cross-sectional view through the valve on line 2 2 of Fig. 3. Fig. 3 is a vertical longitudinal sectional view on line 3 3 of Fig. 2. Fig. 4 is a cross-sectional view on line 4 4 of Fig. 3. Fig. 5 is a cross-sectional view on line 5 5 of Fig. 3. Fig. 6 is a vertical sectional view on line 8 8 of Fig. 3. Fig. 7 is a detail view showing the siphon-break tilted, showing in dotted lines the level of the liquid at the margin of the opening leading to the neck of the siphon. Fig. 8 is a vertical longitudinal section taken at right angles to the section shown in Fig. 6. Fig. 9 is a perspective view of the siphon and inclosure. Fig. 10 is a front elevation showing the dial on the measuring-receptacle.

Reference now being had to the details of the drawings by letter, A designates a liquid-storage reservoir, underneath which is located the measuring-receptacle B, which may be made of any suitable size to hold a definite quantity of liquid. The top of the said receptacle tapers to a ridge C from each end, thus making the highest portion of the receptacle directly over the middle for a purpose which will hereinafter appear. Mounted in the front wall B' of the receptacle is one end of the plug-valve conical-shaped casing D, with suitable packing or a tight liquid-proof joint between same and the wall. Within the valve-cylinder is the conical-shaped valve-plug E, the contracted forward end of which passes through a packed aperture in the end of the cylinder and carries on its end an indicating pointer or handle F. This pointer is held on by a nut F' and is preferably fitted over a squared or flat-faced portion of the valve, whereby the latter may be rotated as the pointer is used as a handle. Interposed between the said pointer and the packing G in the recessed end of the valve-chamber is the spring H, which holds the valve-plug securely within its chamber. The said valve-plug has a central longitudinal partition I, (shown clearly in Fig. 2 of the drawings,) forming two passage-ways J and J', through which the liquid is allowed to enter the measuring-receptacle and to pass from the latter to the spigot.

Leading from the supply-tank to the valve-chamber is a pipe K, through which pipe liquid is allowed to flow into the measuring receptacle and fill the latter, when a duct M in the plug-valve is brought so as to register with the opening leading to said supply-pipe K, such registration being shown clearly in Fig. 2 of the drawings.

Connected to and communicating with the passage-way J' is the pipe N, the other end of which pipe is connected to the siphon O by means of the elbow N'. This siphon widens out at a location near its point of connection with the said elbow, and its passage-way is contracted and terminates in an inverted-J shape, with the opening in its bent end downwardly disposed, as clearly shown in Figs. 6 and 9 of the drawings. By constructing the siphon of this general shape it will be noted that a wide opening into the upper end of the siphon is brought as near as possible to the highest part of the receptacle, as will be noted upon examination of Fig. 1 of the drawings.

Surrounding the edges and the broad side of the siphon adjacent to its open upper end is a shell or casing P, which flares outward at its ends, leaving a considerable amount of space between the edges of the siphon and the ends of said shell or casing. The said shell or casing is cut away at Q on each of the outwardly-flaring ends or sides thereof, with the upper margin of the scalloped or cut-away portion slightly below the opening in the upper end of the siphon. This is an essential part of the present invention and its object will hereinafter appear. One edge of the flaring end on each side is left free to the bottom of the widened portion of the siphon, and through this space the liquid which is to be measured is allowed to flow into the upper end of the siphon.

Located on the outside of the inverted-J-shaped siphon is a vent-pipe R, which communicates with the interior of the siphon through an aperture R', preferably near the middle of the length of the widened portion of the siphon. This vent conforms in shape to the siphon and curves over its J-shaped end and opens on a level with the highest portion of the siphon. The vent-pipe R serves to allow a portion of the air contained within the siphon to escape into the interior of the liquid-containing receptacle above the surface of the liquid as the siphon is swung down under the surface of the liquid. After the spigot at the outlet end of the plug-valve is opened the liquid will run freely and will continue to do so until the siphon breaks.

The plug-valve before referred to has a port S, which is adapted to register and communicate with the passage-way J' in the valve-chamber when the said plug-valve is turned a partial revolution to the right after the port M has been closed, which latter act shuts off the supply of liquid from the reservoir-tank. Leading from the port $S^2$ in the valve inclosure is a vent-pipe T, which extends up and opens near the highest part of the receptacle B.

In order to allow the ingress of air to fill the space made vacant by the withdrawal of liquid from the measuring-tank, I provide the pipe U, which is connected to the opening of the duct U', (seen at Fig. 4,) the other end of said pipe extending up to the highest part of the receptacle B and opening therein. A second vent-pipe W is connected at its lower end to the valve-chamber casing in the duct W', its upper end extending into and near the upper end of the supply-tank. Another vent-pipe V is connected at its lower end to the duct V', while its upper end passes up through the supply-tank and opens into the outside atmosphere. Leading from the duct V' is a pocket V'' in the wall of the valve-chamber. (Shown in Fig. 4 of the drawings.)

Connected to and communicating with the valve-chamber J' at its lowest point is a spigot X, forming a gooseneck trap, and said spigot passes through an opening in the end of the measuring-tank liquid-tight.

On the inner wall of the opening through the siphon on the side from which the vent-pipe R leads away is a projection Q', coming into play only when the siphon is turned down in a substantially horizontal position, in which position it is turned to empty the entire measuring-receptacle. When the siphon is turned down in this position, the projection serves to prevent the dripping of any liquid that may be contained in the siphon after the latter has broken.

In operation the siphon is thown in the position shown in Fig. 2 of the drawings and the duct M registers with the opening leading to the supply-pipe K, when liquid will fill the measuring-receptacle by its flowing through the passage-way J and out the end of the plug. When the receptacle is filled with liquid and it is desired to draw, for instance, a quart of the liquid, the pointer F is turned so that it will register, on a graduated scale or dial, opposite the one-quart mark. As the pointer is turned the plug-valve rotates and with it the siphon. When the one-quart number is indicated on the dial, the siphon will assume, substantially, a vertical position, the port M will have been closed, and the port $S^2$ will register with the chamber J'', and the oil will begin to be siphoned off, passing from the receptacle into the passage-way J', thence through port S into the passage-way J'' and out to the spigot. The liquid will continue to run off until the surface thereof lowers to the level Y, (shown in dotted lines in Fig. 7,) when any further lowering of the liquid will cause air to pass through the scalloped opening and break flow of oil in the siphon and the flow of liquid will cease. It is now desired to return the indicating-pointer to its starting position, and with it the siphon will turn back to its starting position. Prior, however, to the refilling of the measuring-receptacle the space formed in the receptacle from which liquid has been withdrawn is filled with air, which is allowed to pass in the receptacle through the duct W', which is caused to register with the ducts communicating with the pipe V, leading to the outside atmosphere. Now in refilling the receptacle to replace the quantity that has been withdrawn the pointer is turned back to its starting position and with it the plug and the siphon returned to their starting positions. The supply-duct is opened and the exit-port closed as the plug is turned to its starting position, and the liquid will flow into the receptacle until it is filled. As the receptacle fills above the opening into the pipe T the liquid will enter said pipe, will pass down through the same through the port S, thence through the passage-way leading to the lower end of the siphon and up through the latter, and will dispel any air that may be trapped in the upper portion of the siphon, after which the apparatus is ready to measure off liquid again. This vent-tube T only comes into play to allow any air contained within the valve-chamber to escape. The air which is driven out of the siphon by the liquid passing through the same will escape through the pipe U, the registering-duct $D^2$ in the valve, and the pipe W, as shown in Fig. 4.

Supposing that one quart of liquid has been withdrawn from the measuring-receptacle and it is desired to draw two quarts more without returning the siphon to its starting position, which would allow the measuring-receptacle to refill. After the first quart has been withdrawn the siphon, which now assumes substantially a vertical position, contains a quantity of air in the upper end of its duct, which becomes trapped therein, and before the two quarts can be measured off it is necessary to dispel this trapped air. This air which becomes trapped enters the upper end of the siphon at the moment the stream of liquid passing through the siphon breaks, which takes place when the surface of the liquid lowers slightly below the highest portion of the scallops Q. In turning the pointer to register the second measurement the siphon is swung down underneath the surface of the liquid and the liquid will enter through the upper end of the siphon, will force the trapped air out of the siphon and through the vent-pipe R, which opens at any suitable location above the end of the siphon. When the surface of the liquid lowers, so as to expose the margin of the scalloped opening Q, the oil in siphon will break and the flow of liquid will stop. This vent R only comes into play when successive measurements are made without returning the siphon to its starting position.

When it is desired to measure the entire contents of the measuring-receptacle, the siphon is thrown over to a substantially horizontal position and the entire contents of the receptacle will be drawn off through the siphon. In this position the projection Q' in the wall of the siphon comes into play to prevent any dripping or drainings of oil or liquid from the siphon. Air to replace or fill the space formed by successive withdrawals of liquid from the measuring-tank enters through the pipes U and V from the outside atmosphere when the port in the plug-valve is brought into registration with the ends of the said pipes, as would be the case when oil is being withdrawn from the measuring-receptacle.

From the foregoing it will be seen that the essential features of this invention reside in the movable siphon, which in any position in which it may be disposed will have the same relative positions between the scalloped aperture Q and the opening into the mouth of the siphon, and in the provision of the vent communicating with the siphon and the refilling-pipe, together with the vents, which have been hereinbefore described and illustrated in the accompanying drawings.

Having thus described my invention, what I claim to be new, and desire to secure by Letters Patent, is—

1. In a measuring-receptacle, a plug-valve and casing therefor, a siphon turning with said plug-valve, and a vent-pipe carried by the siphon, for the purpose set forth.

2. In a measuring-receptacle, the combination with a plug-valve and casing therefor, of a siphon turning with said valve-plug, a vent-pipe opening into the siphon passage-way below its upper curved end, said pipe having its upper open end curved about the free end of the siphon, as set forth, and for the purpose described.

3. In a measuring-receptacle, the combination with the valve-plug, and casing carrying same with ducts as described, of the siphon communicating with and rotated by said plug, said siphon having a shell outwardly flaring at its upper end, its lower end tapering to shoulders on the siphon, the edges of the shell on one side of the siphon, being open and scalloped, the inner ends of said scallops being below the entrance into the upper end of the siphon, as set forth.

4. In combination with the supply-tank and measuring-receptacle, the plug-valve partitioned and having ports as set forth, the siphon mounted on an extension of said plug-valve, a vent-pipe communicating between one of the compartments of the plug-valve and the upper end of the measuring-receptacle, for the purpose described.

5. A siphon for measuring vessels, mounted as described, combined with a vent-pipe communicating with the interior of the siphon, with the upper end of the said vent-pipe extending above the highest point of the siphon.

6. A siphon for measuring vessels, having an extension or raised portion Q' in the wall of its duct, said siphon adapted to turn in its seat, as set forth and for the purpose described.

7. A siphon having a shell about its upper open end with openings in the longitudinal ends of said shell slightly below the opening into the upper end of the siphon, as set forth.

8. A siphon for measuring vessels having a shell P connected thereto the ends of which are left open, and a scalloped portion Q below the mouth of the duct leading into the siphon, as shown and described.

9. A siphon for measuring-receptacles having in combination therewith a shell P extending over the end of the siphon, the flaring sides P' open on corresponding edges, and scalloped away at Q, as shown and for the purpose set forth.

10. In a measuring vessel, a valve with a duct therein the valve-casing having pockets therein with which the said duct is adapted to register, and the vent-pipes connected with the casing and communicating with the pockets, as shown and described.

11. A valve for measuring-tanks having a longitudinal partition therein forming two passage-ways in the valve, a supply-pipe communicating with one of the passage-ways which communicates with the measuring-receptacle, a siphon, the second passage-way leading from said siphon to the spigot, and a spring and packing on the stem of the valve, as shown and described.

In testimony whereof I affix my signature in presence of two witnesses.

JOHN H. MARTINDALE.

Witnesses:
A. L. HOUGH,
P. L. WEBB.